United States Patent
Lopez et al.

(10) Patent No.: US 10,225,117 B2
(45) Date of Patent: Mar. 5, 2019

(54) METHOD FOR COMMUNICATING DATA IN A WIRELESS COMMUNICATION SYSTEM

(71) Applicant: Telefonaktiebolaget LM Ericsson (publ), Stockholm (SE)

(72) Inventors: Miguel Lopez, Solna (SE); Leif Wilhelmsson, Dalby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 165 days.

(21) Appl. No.: 15/116,127

(22) PCT Filed: May 27, 2016

(86) PCT No.: PCT/SE2016/050492
§ 371 (c)(1),
(2) Date: Aug. 2, 2016

(87) PCT Pub. No.: WO2017/204707
PCT Pub. Date: Nov. 30, 2017

(65) Prior Publication Data
US 2018/0123842 A1    May 3, 2018

(51) Int. Cl.
    H04W 4/00    (2018.01)
    H04L 27/00   (2006.01)
    (Continued)

(52) U.S. Cl.
    CPC ........ *H04L 27/0008* (2013.01); *H04J 11/003* (2013.01); *H04L 5/0007* (2013.01);
    (Continued)

(58) Field of Classification Search
None
See application file for complete search history.

(56) References Cited

U.S. PATENT DOCUMENTS

| 2005/0018783 A1 | 1/2005 | Nakache et al. | |
| 2009/0154589 A1* | 6/2009 | Monnerie | H04L 27/0008 375/269 |

(Continued)

OTHER PUBLICATIONS

Neul et al., "R1-156926: On GMSK/PSK modulation for uplink," 3rd Generation Partnership Project (3GPP), TSG RAN WG1 Meeting #83, Nov. 15-22, 2015, 8 pages, Anaheim, USA.

(Continued)

*Primary Examiner* — Anh Vu H Ly
(74) *Attorney, Agent, or Firm* — Withrow & Terranova, PLLC

(57) ABSTRACT

The present disclosure relates to methods for communicating data in a wireless communication system, especially a method, performed in a wireless device, for transmitting data from the wireless device to a wireless network node in OFDMA system having multiple resource units. The method comprises obtaining instructions to use at least one of the resource units for data transmission, receiving information regarding a set of allowed combinations of transmission parameters to use when modulating signals, modulating signals from the wireless device based on the combination of the received transmission parameters to create signals having constant amplitude and/or continuous phase in the time domain using a modulation scheme other than Orthogonal Frequency-Division Multiplexing, OFDM, and transmitting the modulated signals in the frequency ranges defined by the used at least one of the resource units.

33 Claims, 10 Drawing Sheets

(51) Int. Cl.
*H04J 11/00* (2006.01)
*H04L 5/00* (2006.01)
*H04L 27/10* (2006.01)
*H04L 27/14* (2006.01)
*H04L 27/26* (2006.01)

(52) U.S. Cl.
CPC .......... *H04L 5/0037* (2013.01); *H04L 27/106* (2013.01); *H04J 2211/003* (2013.01); *H04L 27/14* (2013.01); *H04L 27/265* (2013.01); *H04L 27/2628* (2013.01)

(56) References Cited

U.S. PATENT DOCUMENTS

| | | | | |
|---|---|---|---|---|
| 2012/0093039 | A1* | 4/2012 | Rofougaran | H04J 1/00 370/278 |
| 2012/0147814 | A1* | 6/2012 | Valbonesi | H04L 27/0008 370/328 |
| 2013/0201965 | A1 | 8/2013 | Schmidl et al. | |
| 2013/0294219 | A1 | 11/2013 | Peck | |
| 2015/0156003 | A1* | 6/2015 | Khandani | H04L 5/143 370/278 |
| 2016/0227532 | A1* | 8/2016 | Azizi | H04L 69/22 370/328 |
| 2017/0207938 | A1* | 7/2017 | Niemela | H04L 27/0008 370/328 |
| 2017/0214564 | A1* | 7/2017 | Wang | H04L 27/34 370/328 |

OTHER PUBLICATIONS

Nokia Networks et al, "R1-155980: In-band operation for NB-IOT," 3rd Generation Partnership Project (3GPP), TSG-RAN WG1 Meeting #82bis, Oct. 5-9, 2015, 4 pages, Malmö, Sweden.

International Search Report and Written Opinion for International Patent Application No. PCT/SE2016/050492, dated Feb. 14, 2017, 13 pages.

Stacey, Robert, "Specification Framework for TGax," IEEE P802.11 Wireless LANs, IEEE 802.11-15/0132r8, Sep. 22, 2015, 22 pages.

Thompson, Steve, C., et al., "Constant Envelope OFDM," IEEE Transactions on Communications, vol. 56, Issue 8, Aug. 2008, IEEE, pp. 1300-1312.

* cited by examiner

METHOD FOR COMMUNICATING DATA IN A WIRELESS COMMUNICATION SYSTEM

This application is a 35 U.S.C. § 371 national phase filing of International Application No. PCT/SE2016/050492, filed May 27, 2016, the disclosure of which is incorporated herein by reference in its entirety.

TECHNICAL FIELD

The disclosure relates to methods, devices, and computer programs in wireless communication systems. More specifically, the disclosure relates to concurrent transmission of signals using different modulation schemes and to a corresponding multi-modulation receiver.

BACKGROUND

Internet of Things, IoT, is expected to increase the number of connected devices significantly. A vast majority of these devices will likely operate in unlicensed bands, in particular in the 2.4 GHz ISM band. At the same time, there is also increased demand for using the unlicensed bands also for services that traditionally have been supported in licensed bands. As an example of the latter, third generation partnership project, 3GPP, that traditionally develop specifications only for licensed bands have now also developed versions of Long Term Evolution, LTE, which will operate in the 5 GHz unlicensed band.

Technologies that are expected to dominate for IoT services are Bluetooth Wireless Technology, in particular Bluetooth Low Energy, BLE, and future versions of IEEE 802.11 like 802.11ax. With respect to IEEE 802.11, there are currently efforts to standardize a Long Range Low Power, LRLP, mode which at least to some extent builds upon the above mentioned 802.11ax.

IoT applications are foreseen to most often have rather different requirement and features compared to applications like e.g. file download and video streaming. Specifically, IoT applications would typically only require low data rate and the amount of data transmitted in a single packet may often only be a few bytes. In addition, the transmissions to and from many devices will occur very seldom, e.g. once an hour or even less often. The number of IoT devices is expected to be huge, which means that although the amount of data to each one of the devices may be small, the aggregated IoT data may still be substantial. Many use cases for IoT applications can be found in an ordinary house, and may be related to various sensors, actuators, etc. The requirements for coverage are therefore substantially less than what usually can be achieved by e.g. a cellular system. On the other hand, the coverage which can be obtained by e.g. Bluetooth or 802.11b/g/n/ac may not suffice. This may be in particular true if one of the devices is outdoors whereas the other device is indoors so that an exterior with rather high penetration loss is in between the devices.

Due to this short-coming of current versions of Bluetooth wireless technology and IEEE 802.11, both these standardization organizations are working on new versions what would significantly increase the coverage.

The straight-forward approach to increase the range of a communication link is to reduce the bit rate that is used. Reducing the bit rate by necessity means that it will take longer to transmit a packet of a certain size. As a side effect of this, the channel will be occupied for a longer time. Now, with a large number of devices sharing the same channel, the channel may be congested if this sharing is not done in an effective way. The need for long packets and the increased number of users will make this congestion even more pronounced.

Moreover, the amount of non-IoT data, e.g. data download and video streaming, sent over the same channel may also increase. This implies that to obtain good performance for both IoT applications and non-IoT applications, some coordination should preferably take place.

An obvious, and probably the simplest, way to do such coordination is by time sharing between the systems.

However, as the data rate for the IoT system is very low for the individual links, it may likely be hard to obtain good spectrum efficiency in this way. Instead it would be preferable if the two systems, i.e., both the IoT system and the non-IoT system could operate concurrently. One means to achieve this could be if the non-IoT system would be based on Orthogonal Frequency-Division Multiplexing, OFDM. Concurrent operation could then be achieved by assigning one or more sub-carriers to the IoT system and the remaining ones to the non-IoT system. The amount of sub-carriers allocated to the IoT system could in this way be rather flexible.

The approach of using OFDM is conceptually simple and is also the approach suggested for the LRLP mode currently discussed within IEEE 802.11.

On the other hand, variants of Frequency Shift Keying, FSK, modulation are used in e.g. Bluetooth Wireless Technology. Bluetooth employs Gaussian Frequency Shift Keying, GFSK. GFSK is a constant envelope modulation which allows for extremely cost efficient implementations. At the receiver side, one may use a simple limiting receiver, i.e. the Analog-to-Digital Converter, ADC, may be replaced by a simple comparator and there will essentially be no need for Automatic Gain Control, AGC, in the receiver, further simplifying the implementation and reducing the cost. Even more significant is the gain at the transmitter side. Due to that GFSK is constant envelope, there is no need to back-off the power amplifier, PA, and there are no linearity requirements the PA, so that significantly higher power efficiency can be obtained. OFDM is known to suffer severely from a high Peak-to-Average-Ratio, PAR, which means that less efficient transmission. Since an IoT device, such a sensor, may be powered by a coin battery, power efficiency is one of the key features. Constant envelope OFDM has been introduced as a means to eliminate the high PAR. It is a non-linear modulation that involves modification of conventional OFDM by introducing a phase modulator at the transmitter, and additional FFT blocks, as well as rather advanced receiver algorithms at the receiver side.

Today there is no single standard that effectively supports both high-data rate application and really low cost IoT applications, like sensors. The main standard for the former is IEEE 802.11, e.g. 802.11n and 802.11ac, whereas the main standard for the latter is Bluetooth Low Energy, BLE. There is currently work ongoing to further improve the high rate support of 802.11, though the new 802.11ax amendment and work has also been started to enhance the support for IoT through the work on an amendment to support transmission from IoT devices. It has been identified that such an amendment should preferably be made such that IoT support in the Access Point, AP, can be added at essentially no cost by reusing selected parts of the key features of the physical layer from 802.11ax. Although this clearly is an attractive property, it does not address the even more important question namely how to build extremely low cost and low power devices. As 802.11 technologies, in particular 802.11ax, has some non-desirable properties for low cost and especially low power, it does not seem feasible for the low cost device.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

This object is obtained by a method, performed in a wireless device, for transmitting data from the wireless device to a wireless network node in an Orthogonal Frequency-Division Multiple Access, OFDMA, system having multiple resource units. Each resource unit occupies predetermined frequency ranges. The method comprising obtaining instructions to use at least one of the resource units for data transmission, receiving information regarding a set of allowed combinations of transmission parameters to use when modulating signals, modulating signals from the wireless device based on the combination of the received transmission parameters to create signals having constant amplitude and/or continuous phase in the time domain using a modulation scheme other than Orthogonal Frequency-Division Multiplexing, OFDM, and transmitting the modulated signals in the frequency ranges defined by the used at least one of the resource units.

An advantage with the disclosed method for transmitting data from the wireless device is that it provides a means for efficient, low cost low power devices.

According to an aspect, the OFDMA system has a Cyclic Prefix, CP, length, an OFDM symbol length and multiple sub-carriers, each sub-carrier having a centre of frequency. The method further comprises selecting the received set of allowed combinations of transmission parameters to include at least one of the CP length, the OFDM symbol length and centre of frequency of the sub-carriers.

According to an aspect, the step of modulating signals from the wireless device further comprises generating M-ary Frequency Shift Keying, M-FSK, M is an integer two or higher and the M-FSK has a symbol time T, and selecting the M-FSK symbol time T based on the CP length and the OFDM symbol length.

According to an aspect, method further comprises selecting the symbol time T in such a way that the CP length and the OFDM symbol length each are multiples of the M-FSK symbol time T.

This object is also obtained by a method, performed in a network node in an Orthogonal Frequency-Division Multiple Access, OFDMA, system for receiving data transmitted from a wireless device wherein the OFDMA system has multiple resource units. Each resource unit occupies predetermined frequency ranges. The method comprising receiving a multicarrier signal using an Orthogonal Frequency-Division Multiplexing, OFDM, receiver, identifying signals from the wireless device using a modulation scheme other than OFDM in at least one resource unit, converting the identified signals to time domain, and demodulating the converted signals.

An advantage with the method for receiving data is that it provides full reuse of the 802.11ax hardware in the wireless node.

According to an aspect, the OFDMA system has a Cyclic Prefix, CP, length, an OFDM symbol length and multiple sub-carriers; each sub-carrier has a centre of frequency. The method further comprises transmitting a set of allowed combinations of transmission parameters including at least one of the CP length, the OFDM symbol length and the centre of frequency of the sub-carriers to the wireless device.

According to an aspect, the step of demodulating the converted signals comprises using a M-ary Frequency Shift Keying, M-FSK, demodulator, M is an integer two or higher and the M-FSK has a symbol time T, and the method further comprises selecting the M-FSK symbol time T based on at least one of the CP length, the OFDM symbol length and the centre of frequency of the sub-carriers.

According to an aspect, the method further comprises selecting the symbol time T in such a way that the CP length and the OFDM symbol length each are multiples of the M-FSK symbol time T.

According to an aspect, the at least one resource unit is predetermined and the step of identifying the signals from the wireless device further comprises monitoring the predetermined at least one resource unit to identify signals using a modulation scheme other than OFDM.

According to an aspect, the step of identifying the signals from the wireless device further comprises analysing the separated signals to identify the at least one resource unit comprising signals using a modulation scheme other than OFDM.

According to an aspect, the disclosure also relates to a method for communicating data from a wireless device to a wireless network node in an Orthogonal Frequency-Division Multiple Access, OFDMA, system having multiple resource units. Each resource unit occupies a predetermined frequency range. The method comprises transmitting data from the wireless device by obtaining instructions to use at least one of the resource units for data transmission, receiving information regarding a set of allowed combinations of transmission parameters to use when modulating signals, modulating signals from the wireless device based on the combination of the received transmission parameters to create signals having constant amplitude and/or continuous phase in the time domain using a modulation scheme other than Orthogonal Frequency-Division Multiplexing, OFDM, and transmitting the modulated signals in the frequency ranges defined by the used at least one of the resource units, and receiving data in the wireless network node by receiving a multicarrier signal using an Orthogonal Frequency-Division Multiplexing, OFDM, receiver, identifying signals from the wireless device using a modulation scheme other than OFDM in at least one resource unit, converting the identified signals to time domain, and demodulating the converted signals.

According to some aspects, the disclosure relates to a wireless device comprising a communication interface configured to communicate data to a wireless network node in an Orthogonal Frequency-Division Multiple Access, OFDMA, system having multiple resource units each resource unit occupying predetermined frequency ranges. The wireless device further comprises processing circuitry configured to cause the wireless device to obtain instructions to use at least one resource unit when transmitting data to the wireless network node, receive, using the communication interface, information regarding a set of allowed combinations of transmission parameters to use when modulating signals, modulate, using a modulator, signals from the wireless device based on the combination of the received transmission parameters to create signals having constant amplitude and/or continuous phase in the time domain using a modulation scheme other than Orthogonal Frequency-Division Multiplexing, OFDM, and transmit, using the communication interface, the modulated signals in the frequency ranges defined by the used at least one of the resource units.

According to some aspects, the disclosure relates to a wireless network node comprising a communication interface configured to receive data from a wireless device in an Orthogonal Frequency-Division Multiple Access, OFDMA, system having multiple resource units, each resource unit occupying a predetermined frequency range. The wireless network node further comprises processing circuitry configured to cause the wireless network node to receive, using the communication interface, a multicarrier signal using an Orthogonal Frequency-Division Multiplexing, OFDM, receiver, identify signals from the wireless device using a modulation scheme other than OFDM in at least one resource unit, convert, using a converter, the identified signals to time domain, and demodulate, using a demodulator, the converted signals.

According to some aspects, the disclosure also relates to a computer program comprising computer program code which, when executed, causes a wireless device to execute the method for transmitting data to a wireless network node in an OFDMA system according to the present disclosure. The computer program has all the advantages of the method it carries out.

According to some aspects, the disclosure also relates to a computer program comprising computer program code which, when executed, causes a wireless network node to execute the method for receiving data from a wireless device in an OFDMA system according to the present disclosure. The computer program has all the advantages of the method it carries out.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
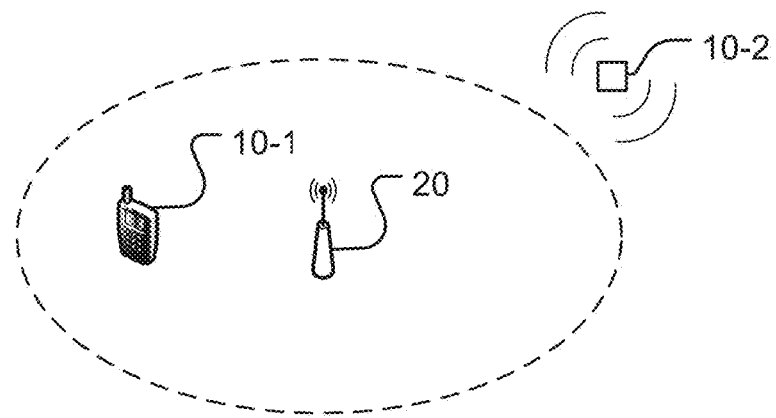
FIG. 1 illustrates a communication network where the inventive concept is applicable.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Some of the example embodiments presented herein are directed towards communication from a wireless device, such as an IoT device, to a wireless network node in an Orthogonal Frequency-Division Multiple Access, OFDMA, system. As part of the development of the example embodiments presented herein, a problem will first be identified and discussed.

In this disclosure, we propose to enhance traditional Orthogonal Frequency-Division Multiplexing, OFDM, transmitters by giving them the capability to generate an M-FSK modulation scheme that is optimized for the low cost mode, i.e., the sensor, but do it in a way which makes possible complete reuse of the 802.11ax hardware in both low energy Internet of Things, IoT, devices and Access Point, AP. That is, we allow the hardware in the IoT device to generate a completely different modulation than used in 802.11ax, by selecting the parameters for the new modulation schemes in a specific way. By doing so, we ensure not only reuse of the hardware, but also that the AP can easily separate 802.11ax and IoT device signals.

The proposed solution provides a means for energy efficient, low cost low power devices as well as full reuse of the 802.11ax hardware in the AP and the low power IoT device.

To ease the description of the invention, specific system parameters are used. However, as should be obvious for anyone of ordinary skill in the art, the disclosure is not limited to these choices of parameters. Also, we will use the terminology commonly used in IEEE 802.11. E.g. we will talk about an access point, AP, when referring to the network node. However, equivalent terms would for instance be base station or node B, NB, or evolved node B, eNB. Similarly, we will talk about a station, STA, when referring to the non-network node. Equivalently, the terms user equipment, UE, IoT device, wireless device, etc., could have been used instead.

Suppose that the AP is to support two different types of STA, one able to transmit and receive high data rates, the other only able to transmit and receive considerably lower data rates. To be more specific, an example of the former STA would be one compliant with 802.11ax, able to transmit and receive signals of 20 MHz or more, e.g. 40, 80, or even 160 MHz. The signal being an OFDM signal, preferably generated by an inverse fast Fourier transform, IFFT. An example of the latter STA could e.g. be one able to transmit and receive using only channel bandwidths up to 2 MHz, An illustration of this is provided in FIG. 1, where STA1, denoted by 10-1, assumed to be the 802.11ax compliant STA, whereas STA2, denoted by 10-2, is a low power IoT device. In FIG. 1 STA2 is illustrated to be farther away from the AP than STA1. This is to highlight that the low power IoT device, due to its potentially much lower rate may have improved range compared to STA1, but the relative placement of the different STA's has no impact or the disclosure as such.

Thus, STA1 is able to support high data rate transmission, e.g. compatible with the 802.11ax standard, whereas STA2 is a low complexity STA only able to support low data rates, applicable in IoT devices. The dashed circle is drawn to illustrate that a connection to STA2 is possible at a larger distance than would be the case if the STA instead had been of the same kind as STA1.

OFDM is a natural choice when high data rate is to be supported as it allows for relatively low complex reception, which in turn depends on that the channel equalization is straightforward. On the other hand, for low data rates, which only require a narrowband channel, single carrier transmission may be preferable. In particular, single carrier modulation which has a constant envelope has some desirable features from a reception point of view. An example of such a modulation is frequency shift keying, FSK, where the information is transmitted in the instantaneous frequency content of the signal. Another example is certain forms of phase shift keying, PSK, where the change of phase is done in a way such the envelope is not changed. Naturally, as the frequency is just the derivative of the phase with respect to time, one may even treat the modulation as either phase or frequency modulation depending on how the reception is performed.

The disclosure proposes an OFDM receiver that allows the receiver hardware in the network node to demodulate a completely different modulation than used in 802.11ax, by selecting the parameters for the new modulation schemes in a specific way. The demodulation is done concurrently with the demodulation of the 802.11ax signal. A part of the frequency spectrum used for devices using a modulation scheme other than OFDM, such as low power IoT devices. A straightforward way of extending the functionality of a network node to receive both signals of the standards is to provide the network node with a separate receiver for each standard, as illustrated in FIG. 2.

Figure 2:
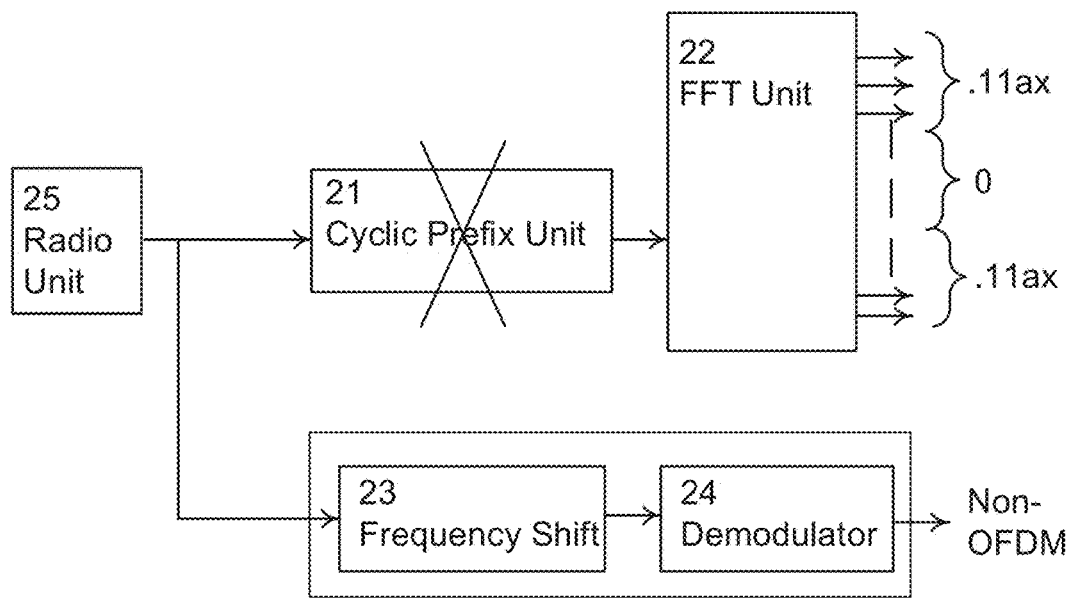
FIG. 2 illustrates an single carrier receiver according to the prior art.

FIG. 2 illustrates a receiver in a network node configured to receive a multi carrier signal in a Radio Unit 25 and concurrently demodulate a non-OFDM signal, suitable for low power IoT devices, and an 802.11ax signal. As OFDM is suitable for high performance communication whereas constant envelope communication is suitable for low cost/low power communication and it can be expected that an AP preferably should be able to support both types of transmissions concurrently.

One way to combine 802.11ax and low power IoT reception is processing the 802.11ax signal by first removing the cyclic prefix in a cyclic prefix unit 21 (the cross-over is to denote that the cyclic prefix, CP, is removed, i.e. the reverse operation from the transmitter side where it is added) and then separating the subcarriers in an FFT unit 22 and at the output simply discard the subcarriers not used for 802.11ax, and then demodulate non-OFDM signal separately for instance using a Frequency Shift Keying, FSK, receiver. Here the frequency shift is done by a frequency shift unit 23 so that the non-OFDM signal is centered around DC frequency, merely to illustrate that a following demodulator 24 is not affected by where in frequency range the non-OFDM signal is located. Naturally, the frequency shift corresponds to those subcarriers that will not be used at the output of the FFT Unit 22.

However, such a solution implies that one demodulator is used for each respective standard. Although conceptually simple, it means additional complexity. Moreover, although some of the sub-carriers are not used by the high data rate signal, it does not mean that placing a low-rate signal in the gap will ensure that signal do not interfere with one another, i.e., they will not necessarily be orthogonal. Moreover, the systemization and architecture of an OFDMA receiver may not be well suited to receive an arbitrary low rate signal. Also, just because the subcarriers located where the non-OFDM signal are not used, it will typically experience interference from the 802.11ax signal due to that it is not an OFDM signal and has very different spectral properties.

Figure 3:
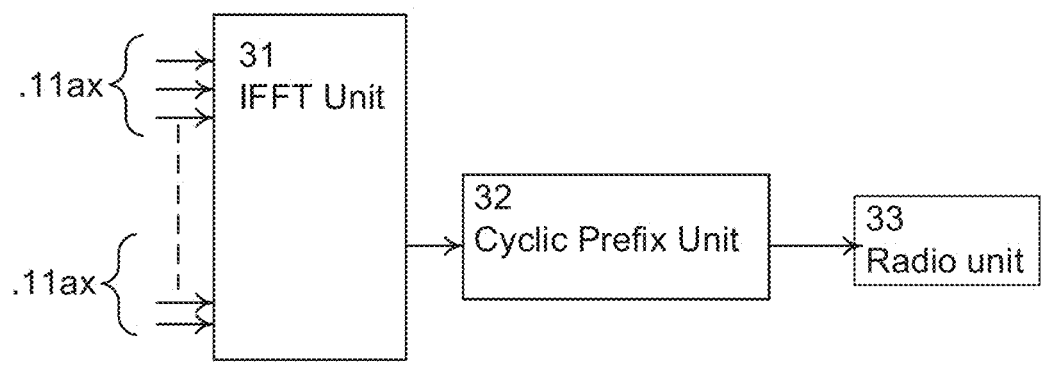
FIG. 3 illustrates a block diagram of an OFDM transmitter.

In order to increase the understanding of the present disclosure, a block diagram for an OFDM transmitter is shown in FIG. 3. First the information is processed by an IFFT Unit 31, which effectively transforms the signals from the frequency domain to the time domain. After that a cyclic prefix, CP is added in a Cyclic Prefix Unit 32. The signal is passed through a digital-to-analog converter, DAC, after which it up-converted in frequency to the carrier frequency. Finally the signal is amplified before transmitted, as indicated by the Radio Unit 33. Naturally, this is a simplification but as the disclosure is concerned with the digital part, whereas the DAC and the analog parts are unaffected, it serves the purpose to see where in the transmitter the illustrated example embodiments may be used.

The disclosure discloses methods to generate constant envelope M-FSK signals in low power IoT devices, in such a way that the transmitter of a low power IoT device is compatible with already existing OFDM transmitter hardware/software (e.g. 802.11n/ac/ax) and such that the AP can easily receive and decode simultaneous transmissions from low power IoT devices and OFDM STA's multiplexed in the frequency domain.

Figure 4A:
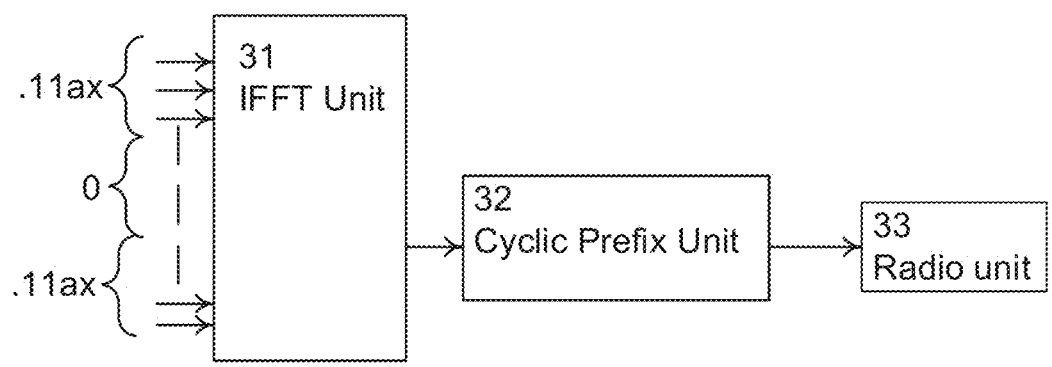
FIGS. 4A and 4B illustrate how a low rate signal can be transmitted concurrently with an OFDM signal.

Frequency domain multiplexing of transmissions from 802.11ax STA and low power IoT devices could easily be achieved by simply not transmitting any 802.11ax signal on some of the sub-carriers, i.e., effectively setting the corresponding frequency bins to zero in the IFFT, as illustrated in FIG. 4a. This will result in a "gap" in the spectrum. This gap can be placed where desired by simply setting the corresponding sub-carriers to zero. The low rate signal can then be assigned the nulled 802.11ax sub-carriers.

Figure 4B:
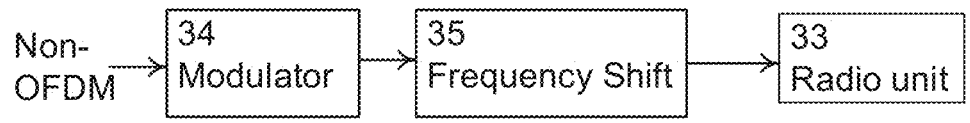

FIG. 4a illustrates an OFDM transmitter, as illustrated in FIG. 3, which is used for 802.11ax transmissions and FIG. 4b illustrates a separate non-OFDM transmitter comprising a non-OFDM modulator 34 which is used for low rate transmissions. A frequency shift unit 35 is applied to the modulated non-OFDM signal to place the low rate signal in the gap created in the spectrum.

The present disclosure presents an effective means to generate both signals in a way that ensures that they can be simultaneously received by an OFDMA receiver using a single FFT in order to separate multiple users.

To further describe the disclosure, it has been assumed that the nominal channel bandwidth is 20 MHz, that the signal is generated using a 256 point inverse fast Fourier transform, IFFT, so that the sub-carrier spacing becomes 20/256 MHz=78.125 kHz, and that the duration of one OFDMA symbol is 256/20 us=12.8 us, not including the cyclic prefix, CP. This corresponds to what is used in 802,11ax. The CP length can be 0.8 us, 1.6 us or 3.2 us.

Figure 5:
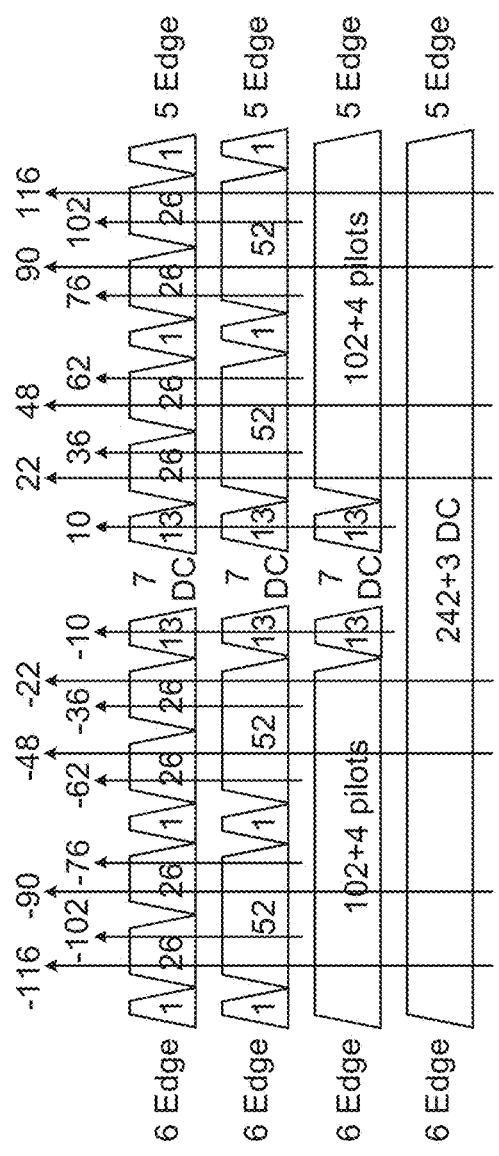
FIG. 5 illustrates different possible allocations of resources according to some aspects of the disclosure.
Figure 11:
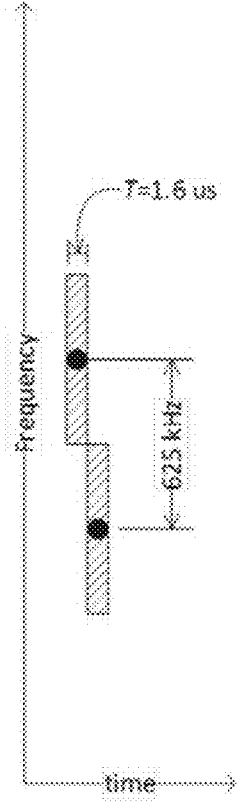
FIG. 11 illustrates a first example embodiment of system parameters for a 2-FSK transmitted in an 802.11ax OFDMA system.

As is proposed for IEEE 802.11ax, orthogonal frequency division multiple access, OFDMA, is used to allow simultaneous transmission to and from several wireless devices, see FIG. 5 (taken from IEEE 802.11-15/0132r8, September 2015, FIG. 11, page 10).

Depending on how much information should be received from a high rate STA, the STA can be allocated more or less of the total available bandwidth. According to FIG. 5, the smallest resource unit, RU, is 26 sub-carriers, which corresponds to a bandwidth of about 2 MHz (26*78.125 kHz=2.031 MHz), In general, a STA may be allocated a 26 sub-carrier RU, a 52 sub-carrier RU, a 106 sub-carrier RU, or the full bandwidth which corresponds to 242 sub-carriers. It is assumed that the AP supports transmission and reception over the entire 20 MHz band width, BW, but for the present disclosure only transmission from the two different kinds of STAs to the AP is of interest. If there are two or more STAs of one kind, this can also be supported by the very same methodology.

In FIG. 5, which is a rather detailed figure of possible allocation of users in a 20 MHz channel, the exact usage of the different sub-carriers is shown. The different resource unit, RU, sizes mentioned above and how they are placed are clearly shown, as are the location of the pilot tones, in the figure marked as arrows. Pilot tones are tones that are known by the receiver and therefore can be used by the receiver to perform e.g. channel estimation. If only 802.11ax STAs were to be supported, the different RU could be allocated to different STAs in a suitable way, with possibly varying RU sizes allocated to the different STAs. In what follows, suppose that the 5th RU consisting of 26 sub-carriers is not used for an 802.11ax STA, but instead the corresponding frequencies are to be used to generate a signal that can be transmitted by a low power IoT device. This 26 sub-carrier RU is shown in some more detail in FIG. 6.

Figure 7:
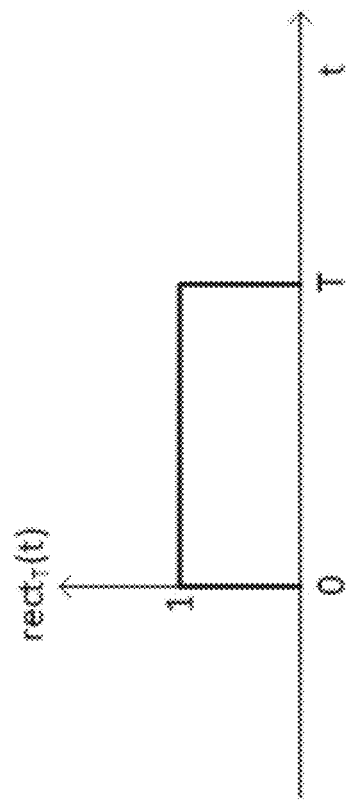
FIG. 7 illustrates a rectangular pulse of duration T in a M-FSK modulation scheme.
Figure 6:
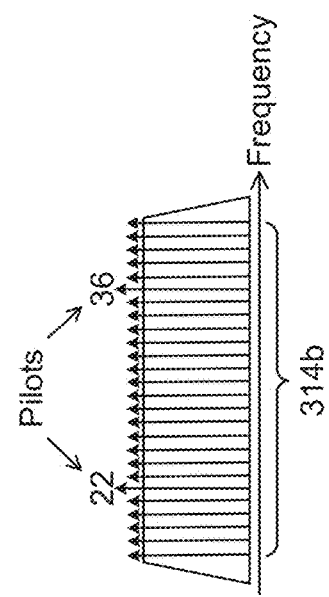
FIG. 6 illustrates a twenty six subcarrier wide resource unit according to some aspects of the disclosure.

According to the present disclosure, the low power IoT device is assigned one RU (as depicted in FIG. 6). The low rate transmitter generates the baseband signal utilizing non-OFDM modulation, such as M-FSK modulation. The baseband transmitted signal x(t) has form given in equation (1).

$$x(t)=\Sigma_n e^{j2\pi f_n t}\text{rect}_T(t-nT), \quad (1)$$

where T is the symbol time and $\text{rect}_T(.)$ is rectangular pulse of duration T, depicted in FIG. 7.

The frequencies $f_n$ take on M possible values $\{f_1, \ldots, f_M\}$.

According to one example embodiment of the disclosure, the M-FSK signal obeys the following constraints.

1. Let $T_{CP}$ be the duration of the cyclic prefix in the OFDMA system, and $T_{OFDM}$ the duration of one OFDM symbol (excluding the CP). Then the symbol duration T is chosen such that both the CP length and the OFDM symbol length are multiples of the M-FSK symbol length. That is, there are positive integers P and Q such that $T_{CP}=P\cdot T$ and $T_{OFDM}=Q\cdot T$. This implies that $T_{CP}+T_{OFDM}=KT$, where K=P+Q.

For example, assuming 802.11ax with a CP=3.2 us and $T_{OFDM}$=12.8 us, one could e.g. choose T=0.8 us, 1.6 us or 3.2 us. In other words, the Symbol time of M-FSK is chosen depending on the OFDM symbol length and CP length. Moreover, transmissions in uplink, UL, are frame synchronized whenever more than two users (including OFDM users) transmit simultaneously, as is done in OFDMA systems.

In another embodiment of the disclosure, the baseband signal (1) also obeys the following constraints.

2. If N is the number of subcarriers in the OFDMA system (i.e. the FFT size) then K (recall that $K=(T_{CP}+T_{OFDM})/T$) is a divisor of N. That is, there is an integer p such that N=pK. This will give desirable spectral properties to x(t) because the spectrum of the rectangular pulse will have some zeros in common with the zeros in the spectrum of the OFDM signal.

3. The frequencies $f_n$ coincide with the frequencies in the OFDMA sub-channel raster. In other words, if $\Delta f$ is the sub-carrier spacing in the OFDMA system, then there are integers $k_n$ such that $f_n=k_n \Delta f$.

The waveform x(t) has constant envelope. That is, its PAR is exactly 0 dB. Moreover, when conditions 1, 2 and 3 above are satisfied, the signal x(t) possesses some useful properties:

The phase of the signal x(t) is continuous, unlike the phase of general OFDM signals, This leads to reduced spectral leakage to adjacent bands when compared to OFDM.

The signal x(t) is a special case of an OFDM signal, since in this case it can be generated using an OFDM transmitter using a symbol duration T, and restricted to employ only one unmodulated subcarrier in any given OFDM symbol. In other words, the input to the IFFT is either 0 or 1. Moreover, it is not necessary to introduce a CP. Hence, the proposed M-FSK modulator can be easily implemented in TX hardware that supports OFDM TX. This allows re-use of hardware and software for low power IoT devices.

Hence, the disclosure proposes a wireless device configured for transmitting data from the wireless device to a wireless network node, using the principle explained above. The wireless device is e.g. a low power IoT device configured to transmit data using a modulation scheme other than Orthogonal Frequency-Division Multiplexing, OFDM, to an OFDM receiver in the wireless network node.

The wireless device comprises a communication interface 33 configured to communicate data to a wireless network node in an Orthogonal Frequency-Division Multiple Access, OFDMA, system having multiple resource units, each resource unit occupying predetermined frequency ranges. The wireless system further comprises processing circuitry configured to cause the wireless device 10 to obtain instructions of resource units to be used, receive information of transmission parameters, modulate signals and transmit the modulated signals. These steps are explained in more detail below.

In order to facilitate the transmission of data from the wireless device to the OFDM receiver, it is necessary to obtain instructions to use at least one resource unit when transmitting data to the wireless network node 20. As an example, this may be achieved by receiving information from a network node within the OFDMA system, or from a memory within the wireless device.

Furthermore, the wireless device is required to receive, using the communication interface 24, information regarding a set of allowed combinations of transmission parameters to use when modulating signals. The modulation performed in the next step requires this information to create signals having desired characteristics.

In the modulation step, the wireless device is configured to modulate, using a modulator 34, signals to be transmitted from the wireless device based on the combination of the received transmission parameters to create signals having constant amplitude and/or continuous phase in the time domain using a modulation scheme other than Orthogonal Frequency-Division Multiplexing, OFDM. A non-OFDM signal having constant amplitude and/or continuous phase will be beneficial when transmitting the data concurrently with data from high-data rate applications in the same OFDMA system.

Finally, the wireless device has to transmit, using the communication interface 33, the modulated signals in the frequency ranges defined by the used at least one of the resource units. If transmitting the modulated signals outside the frequency ranges, an interference with the high-data rate applications is most likely.

The OFDMA system has a Cyclic Prefix, CP, length, an OFDM symbol length and multiple sub-carriers, each sub-carrier having a centre of frequency, and according to some aspects of the disclosure, the received information regarding the set of allowed combinations of transmission parameters comprises at least one of the CP length, the OFDM symbol length and the centre of frequency of the sub-carriers, and according to this aspect the processing circuitry is further configured to cause the wireless device to modulate, using the modulator 34, signals from the wireless device based on at least one of the CP length, the OFDM symbol length and the centre of frequency of the sub-carriers.

According to some aspects of the disclosure, the processing circuitry is further configured to cause the wireless device to modulate, using the modulator 34, signals using M-ary Frequency Shift Keying, M-FSK, M is an integer two or higher and the M-FSK has a symbol time T, and select the M-FSK symbol time T based on the CP length and the OFDM symbol length.

According to some aspects of the disclosure, the processing circuitry is further configured to cause the wireless device to select the M-FSK symbol time T in such a way that the CP length and the OFDM symbol length each are multiples of the M-FSK symbol time T.

According to some aspects of the disclosure, the duration of the CP length, $T_{CP}$, and the duration of the OFDM symbol length, $T_{OFDM}$, is expressed as:

$T_{CP}=P \cdot T$ and $T_{OFDM}=Q \cdot T$; P and Q are positive integers, $K \cdot T = T_{CP} + T_{OFDM}$, wherein $K=P+Q$; K is a positive integer.

In this aspect, the processing circuitry is further configured to cause the wireless device 10 to select the M-FSK symbol time T to be:

$T=(T_{CP}+T_{OFDM})/K.$

Assume N is the number of subcarriers in the OFDMA system. Then, according to some aspects of the disclosure, the processing circuitry is further configured to cause the wireless device to select K to be a divisor of N.

Subcarriers of the OFDMA system are arranged in a sub-channel raster, and according to some aspects of the disclosure, the processing circuitry is further configured to cause the wireless device to select frequencies of the signals to generate an M-FSK modulation having frequencies coinciding with the frequencies present in the OFDMA sub-channel raster.

According to some aspects of the disclosure, the processing circuitry is further configured to cause the wireless device to receive transmissions from the wireless network node indicating at least one resource unit available when transmitting the modulated signals.

Figure 8:
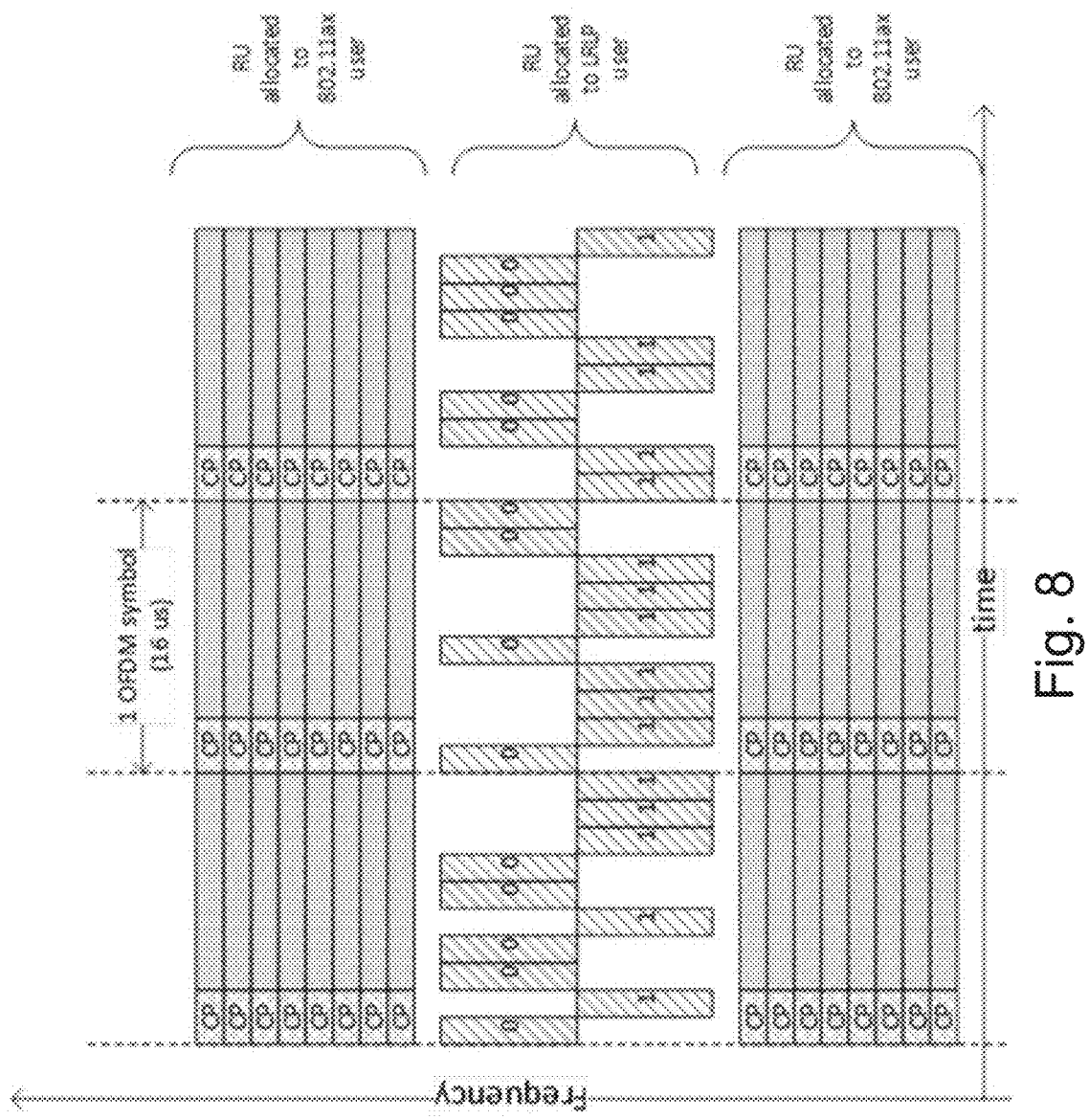
FIG. 8 illustrates resource unit allocation in the time-frequency plane according to some aspects of the disclosure.

FIG. 8 illustrates how the time-frequency resources are assigned by the AP and utilized by multiple users.

At the receiver side, the AP separates the multiple users using an OFDMA receiver and a single Fast Fourier Transform, FFT. The sub-carriers corresponding to a low power IoT device are converted back to the time domain using an Inverse Fast Fourier Transform, IFFT, and is then fed to a non-OFDM receiver, such as an M-FSK receiver. M-FSK may be demodulated using coherent or non-coherent receivers. One advantage of non-coherent reception is that neither channel estimates nor pilots are needed, thus reducing the overhead, which is desirable for low power IoT devices.

Figure 9:
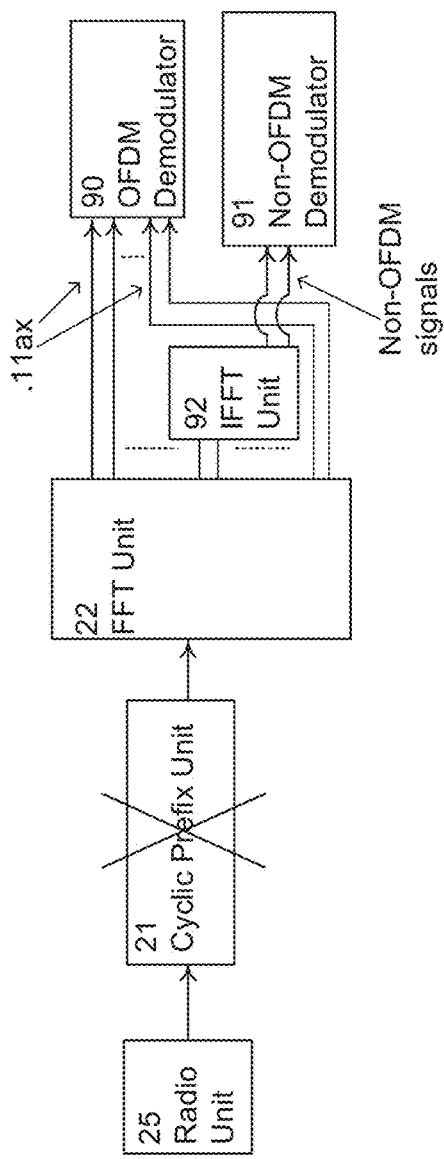
FIG. 9 illustrates a first aspect of how a network node separates and demodulates multiple signals according to some aspects of the disclosure.
Figure 10:
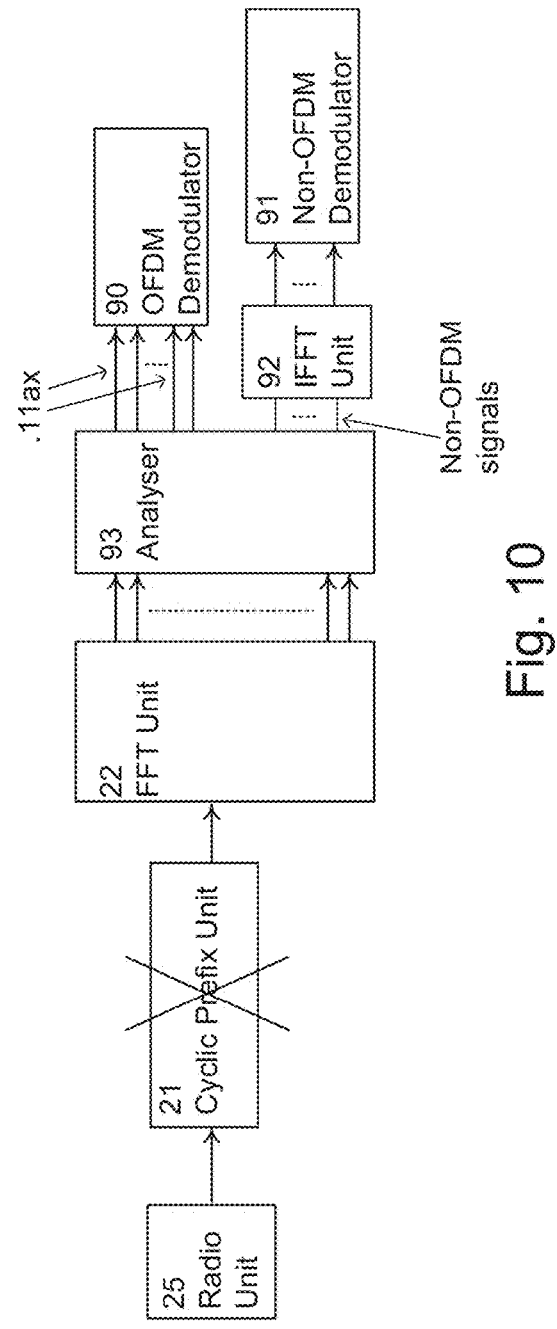
FIG. 10 illustrates a second aspect of how a network node separates and demodulates multiple signals according to some aspects of the disclosure.

FIGS. 9 and 10 are a block diagrams illustrating examples of how an AP separates and demodulates multiple users' signals in a network node.

The disclosure also proposes a wireless network node configured to receive data from a wireless device 10. The wireless network node comprises a communication interface 25 configured to receive data from a wireless device in an Orthogonal Frequency-Division Multiple Access, OFDMA, system having multiple resource units, wherein each resource unit occupies a predetermined frequency range. The network node further comprises processing circuitry configured to cause the wireless network node to: receive a multi-carrier signal, identify non-OFDM signals, convert the identified signals and demodulate the converted signals. These steps are described in more detail below.

First, the wireless network node is configured to receive, using the communication interface 25, a multicarrier signal using an Orthogonal Frequency-Division Multiplexing, OFDM, receiver. According to some aspects of the disclosure, the processing circuitry is further configured to cause the wireless network node to separate, using a Fast Fourier Transform, FFT, signals received by the OFDM receiver.

When the multicarrier signal is received, it is required to identify signals from the wireless device using a modulation scheme other than OFDM in at least one resource unit. The wireless network node may be informed of the resource unit used by the non-OFDM signals, or an additional analysing step is required to determine the correct resource unit as explained below.

The identified signals are in the frequency domain and in order to be able to demodulate the non-OFDM signals it is necessary to convert, using a converter 92, the identified signals to time domain. According to some aspects of the disclosure, the converter 92 is a single Inverse Fast Fourier Transform, IFFT.

Finally, the wireless network node is configured to demodulate, using a demodulator 91 (i.e. a demodulator using a modulation scheme other than OFDM), the converted signals.

According to some aspects of the disclosure, the at least one resource unit is predetermined and the processing circuitry is further configured to cause the wireless network node to monitor the predetermined at least one resource unit to identify signals using a modulation scheme other than OFDM, as illustrated in connection with FIG. 9.

According to another aspect of the disclosure, the processing circuitry is further configured to cause the wireless network node to analyse, using an analyser 93, the separated signals to identify the at least one resource unit comprising signals using a modulation scheme other than OFDM, as illustrated in connection with FIG. 10.

The OFDM receiver needs to determine, prior to demodulation, whether a non-OFDM signal is being received in any given resource unit. This can be accomplished in two ways. The first is by scheduling or restricting access to the resource unit to a particular class of devices. For example, the AP can transmit a trigger frame containing a scheduling grant for a particular device, where the resource unit and the time for the transmissions are implicitly or explicitly specified. The second way is by performing so-called auto-detection or blind detection, and works as follows. The received packet consists of both data and training symbols. The training symbols impart a known structure in the signal that can be used at the receiver side to estimate the type of modulation used in the signal. As an example, in 802.1.1.n/ac/ax, the training symbols are located in the preamble, at the beginning of the packet, and the packets are typically discovered by detecting the repetition of a known pattern, with a known periodicity. A packet using a different modulation could be detected if it carries training symbols in its preamble, having a different repetitive pattern with a different periodicity than OFDM modulated packets. The OFDM receiver would then hypothesize different modulations and the hypothesis that matches best the actual received pattern is chosen. Measures of match or mismatch are often obtained by means of correlators.

According to an aspect of the disclosure, the processing circuitry is further configured to cause the wireless network node to transmit, using the communication interface 25, instructions to the wireless device indicating at least one resource unit to use when transmitting modulated signals to the wireless network node.

The OFDMA system has a Cyclic Prefix, CP, length, an OFDM symbol length and multiple subcarriers, each subcarrier has a centre of frequency, and according to some aspects of the disclosure the processing circuitry is further configured to cause the wireless network node to determine a set of allowed combinations of transmission parameters including at least one of the CP length, the OFDM symbol length and the centre of frequency of the sub-carriers, and transmit, using the communication interface 25, the set of allowed combinations of transmission parameters to the wireless device.

According to some aspects of the disclosure, the modulation scheme other than OFDM is M-ary Frequency Shift Keying, M-FSK, M is an integer two or higher and the M-FSK has a symbol time T. The processing circuitry is, according to this aspect, further configured to cause the wireless network node to select the M-FSK symbol time T based on at least one of the CP length, the OFDM symbol length and the centre of frequency of the sub-carriers.

According to some aspects of the disclosure, the processing circuitry is further configured to cause the wireless network node to select the symbol time T in such a way that the CP length and the OFDM symbol length each are multiples of the M-FSK symbol time T.

According to some aspects of the disclosure, the duration of the CP length, $T_{CP}$, and the duration of the OFDM symbol length, $T_{OFDM}$, is expressed as:

$T_{CP}=P \cdot T$ and $T_{OFDM}=Q \cdot T$; P and Q are positive integers, $K \cdot T = TCP + T_{OFDM}$, wherein $K=P+Q$; K is a positive integer.

In this aspect, the processing circuitry is further configured to cause the wireless network node to select the M-FSK symbol time T to be:

$T=(T_{CP}+T_{OFDM})/K.$

Assume N is the number of subcarriers in the OFDMA system. Then, according to some aspects of the disclosure, the processing circuit is further configured to cause the wireless network node to select K to be a divisor of N.

Exemplifying Embodiments

Binary FSK

In a first embodiment, the modulation used for the low data rate IoT device is based on binary FSK, i.e., a logical zero is transmitted using one sub-carrier and a logical one is transmitted using another sub-carrier, i.e., one of the two sub-carriers is used but not both at the same time.

First Example

Using the OFDM numerology 802.11ax, the following parameters may be used for a low rate transmission Suppose that the cyclic prefix duration in the 802.11ax system is $T_{CP}=3.2$ us or $T_{CP}=1.6$ us. In this case the AP allocates the low power IoT device one RU consisting of 26 subcarriers (approx. 2.03 MHz), as illustrated in FIG. 6. The low rate transmission has a symbol duration T=1.6 us, and the spacing between frequencies 625 kHz (=8×78125 Hz, i.e. 8 subcarriers in the 802.11ax system). Referring to FIG. 6, the center of frequencies for the two tones in the FSK modulation coincide with the center of frequency of sub-carriers number 8 and 16. An illustration is given in FIG. 11.

FIG. 11 illustrates system parameters for a 2-FSK transmitted in an 802.11ax OFDMA system. The solid black dots indicate the center of frequency of the tones used for FSK.

Figure 13:
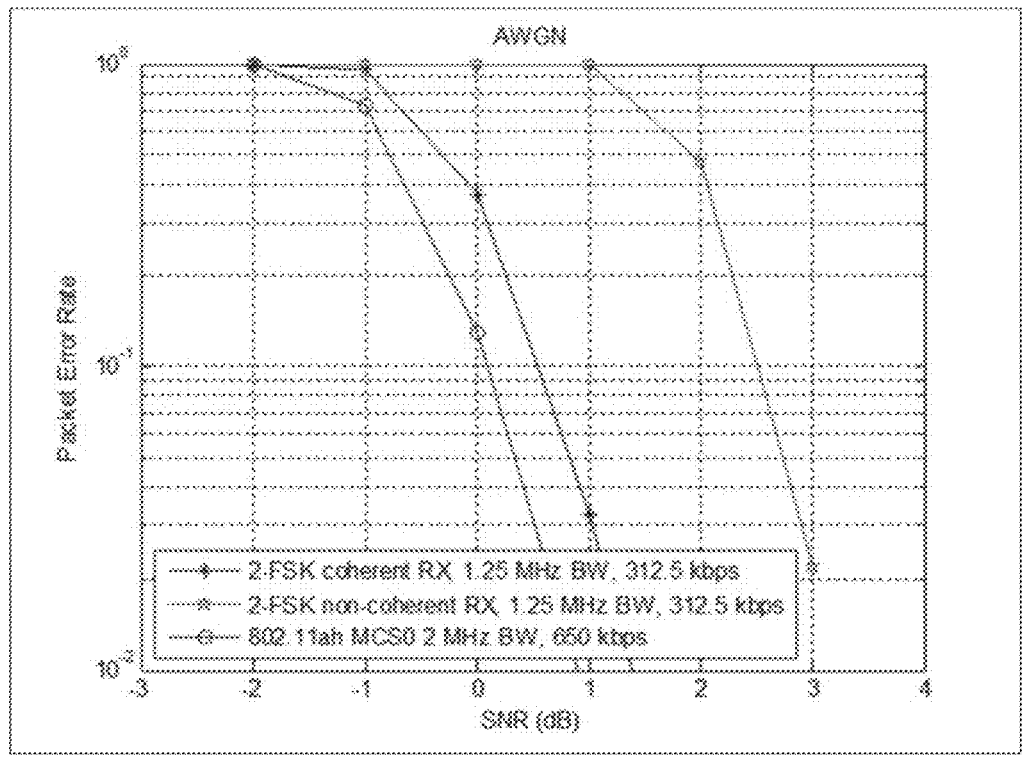
FIG. 13 illustrates simulated link performance for 2-FSK according to some aspects of the disclosure.

Using a rate ½ convolutional channel code, the low rate transmission has a data rate equal to 312.5 kbps. The low power IoT device would utilize a total bandwidth of 1.25 MHz. FIG. 13 illustrates the performance of 2-FSK utilizing the system parameters described above and the receiver structure shown in FIG. 9. The link performance in an Additive White Gaussian Noise, AWGN, channel is given for both coherent and non-coherent reception. As a comparison, the performance of a 802.11ah MCS0 STA is also given. The 802.11ah STA and the low power IoT device use the same channel code with rate ½. Note that the low power IoT device has a PAR of 0 dB and a noise floor 2 dB lower than the 802.11ah transmission, since it utilizes only 1.25 MHz band width. A coherent detector for 2-FSK gives a performance loss of 0.5 dB, when compared to MCS0 in 802.11ah. Assuming a power amplifier back-off equal to 4 dB for the 802.11ah STA (due to requirements on out of band emissions and EVM), the result is that low power IoT devices with 2-FSK modulation according to the disclosure would give around 4 dB+2 dB−0.5 dB=5.5 dB better link performance, for the same output power, at the cost of halving the data rate.

Figure 14:
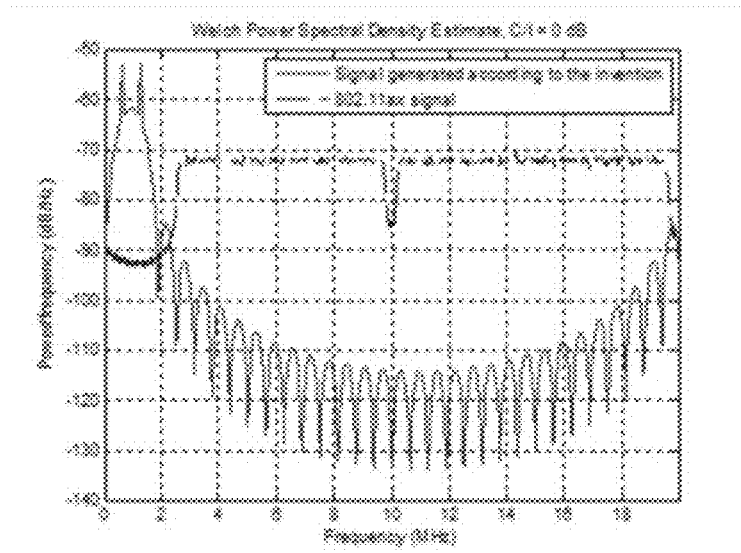
FIG. 14 illustrates spectra of 802.11ax OFDM signal and a 2-FSK low rate signal according to some aspects of the disclosure.

The spectral characteristics of a low rate signal, constructed as illustrated in FIG. 11, are shown in FIG. 14. The leftmost RU of 2.03 MHz is allocated to a low power IoT device using the modulation as described in this section, while it is assumed that 802.11ax transmissions occupy the rest of the spectrum. The carrier to interference, C/I, ratio is 0 dB, which means that the same total power is used by the low rate and 802.11ax transmissions. This implies that the low rate transmission is about 9 dB stronger per RU of 2.03 MHz. It can be seen that co-existence between the two types of transmissions is feasible as long as the power imbalance between low power IoT devices and 802.11ax users is not too large.

Second Example

Figure 12:
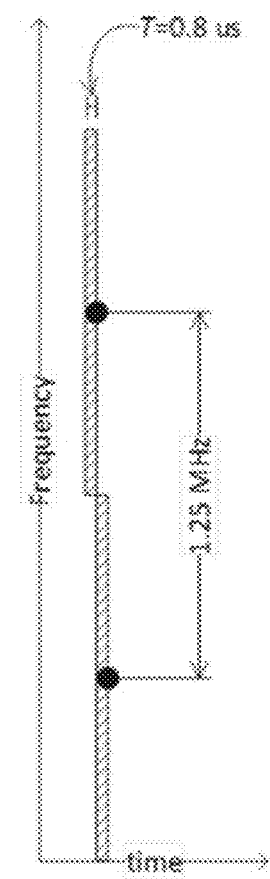
FIG. 12 illustrates system a second example embodiment of system parameters for a 2-FSK transmitted in an 802.11ax OFDMA system.

Using the OFDM numerology 802.11ax, the following parameters may be used for a low rate transmission Suppose that the cyclic prefix duration in the 802.11ax system is $T_{CP}$=0.8 us. In this case the AP allocates the low power IoT device one RU consisting of 52 subcarriers (approx. 4.06 MHz). The low rate transmission has a symbol duration T=0.8 us, and the spacing between frequencies 1.25 MHz (=16×78125 Hz. i.e. 16 subcarriers in the 802.11ax system). Referring to FIG. 6, the center of frequencies for the two tones in the FSK modulation coincide with the center of frequency of subcarriers number 18 and 34 (in a 52 subcarrier allocation where the subcarriers are numbered 1 to 52). FIG. 12 illustrates system parameters for a 2-FSK transmitted in an 802.11ax OFDMA system. The solid black dots indicate the center of frequency of the tones used for FSK.

M-FSK

In a second embodiment, the information from the low power IoT device is sent using M-level FSK, where M preferably is a power of two, i.e., M=4, 8, . . . , although in principle also other values of M is possible. That is, one out of M sub-carriers is used for transmitting the information in each OFDM symbol. M-level FSK is a means to increase the data rate compared to the binary case, i.e., M=2. However, as the number of required sub-carriers grows linearly with M it is rather wasteful in terms of spectrum usage.

Figure 15:
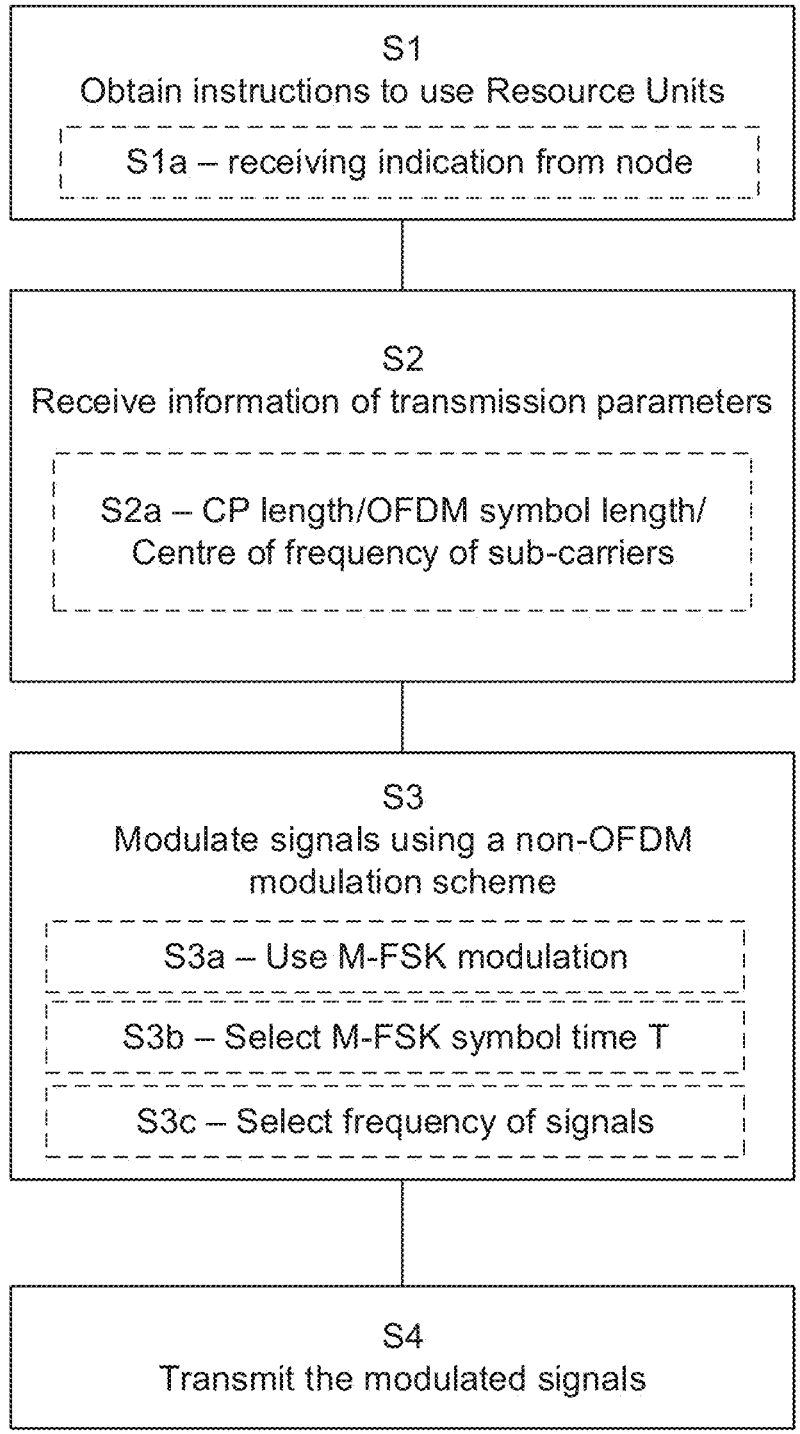
FIG. 15 is a flowchart that illustrates the method steps for transmitting data using a non-OFDM signal in an OFDMA system.

FIG. 15 is a flowchart that illustrates a method, performed in a wireless device, for transmitting data from the wireless device to a wireless network node in an Orthogonal Frequency-Division Multiple Access, OFDMA, system having multiple resource units, each resource unit occupying predetermined frequency ranges.

The first step in the flow comprises obtaining S1 instructions to use at least one of the resource units for data transmission. According to some aspects of the disclosure, the step of obtaining instructions to use at least one resource unit comprises receiving S1a transmissions from the wireless network node indicating at least one resource unit available when transmitting the modulated signals.

The flow continues to the second step comprising receiving S2 information regarding a set of allowed combinations of transmission parameters to use when modulating signals. According to some aspects of the disclosure, the OFDMA system has a Cyclic Prefix, CP, length, an OFDM symbol length and multiple sub-carriers, each sub-carrier having a centre of frequency, and according to this aspect the method further comprises selecting S2a the received set of allowed combinations of transmission parameters to include at least one of the CP length, the OFDM symbol length and centre of frequency of the sub-carriers.

Thereafter, the flow continues to the third step comprising modulating S3 signals to be transmitted from the wireless device based on the combination of the received transmission parameters to create signals having constant amplitude and/or continuous phase in the time domain using a modulation scheme other than Orthogonal Frequency-Division Multiplexing, OFDM.

Finally, the fourth step ends the flow by transmitting S4 the modulated signals in the frequency ranges defined by the used at least one of the resource units.

According to some aspects of the disclosure, the step of modulating signals from the wireless device further comprises generating S3a M-ary Frequency Shift Keying, M-FSK, M is an integer two or higher and the M-FSK has a symbol time T, and selecting S3b the M-FSK symbol time T based on the CP length and the OFDM symbol length.

According to some aspects of the disclosure, the method further comprises selecting the symbol time T in such a way that the CP length and the OFDM symbol length each are multiples of the M-FSK symbol time T.

According to some aspects of the disclosure, the duration of the CP length, $T_{CP}$, and the duration of the OFDM symbol length, $T_{OFDM}$, is expressed as:

$T_{CP}$=P·T and $T_{OFDM}$=Q·T; P and Q are positive integers, K·T=$T_{CP}$+$T_{OFDM}$, wherein K=P+Q:, K is a positive integer.

According to this aspect, the M-FSK symbol time T is selected to be:

$$T=(T_{CP}+T_{OFDM})/K.$$

Assume N is the number of subcarriers in the OFDMA system, and according to some aspects of the disclosure, K is a divisor of N.

Sub-carriers of the OFDMA system are arranged in a sub-channel raster, and according to some aspects of the disclosure, the method further comprises selecting S3c frequencies of the signals to generate an M-FSK modulation having frequencies coinciding with frequencies present in the OFDMA sub-channel raster.

Figure 16:
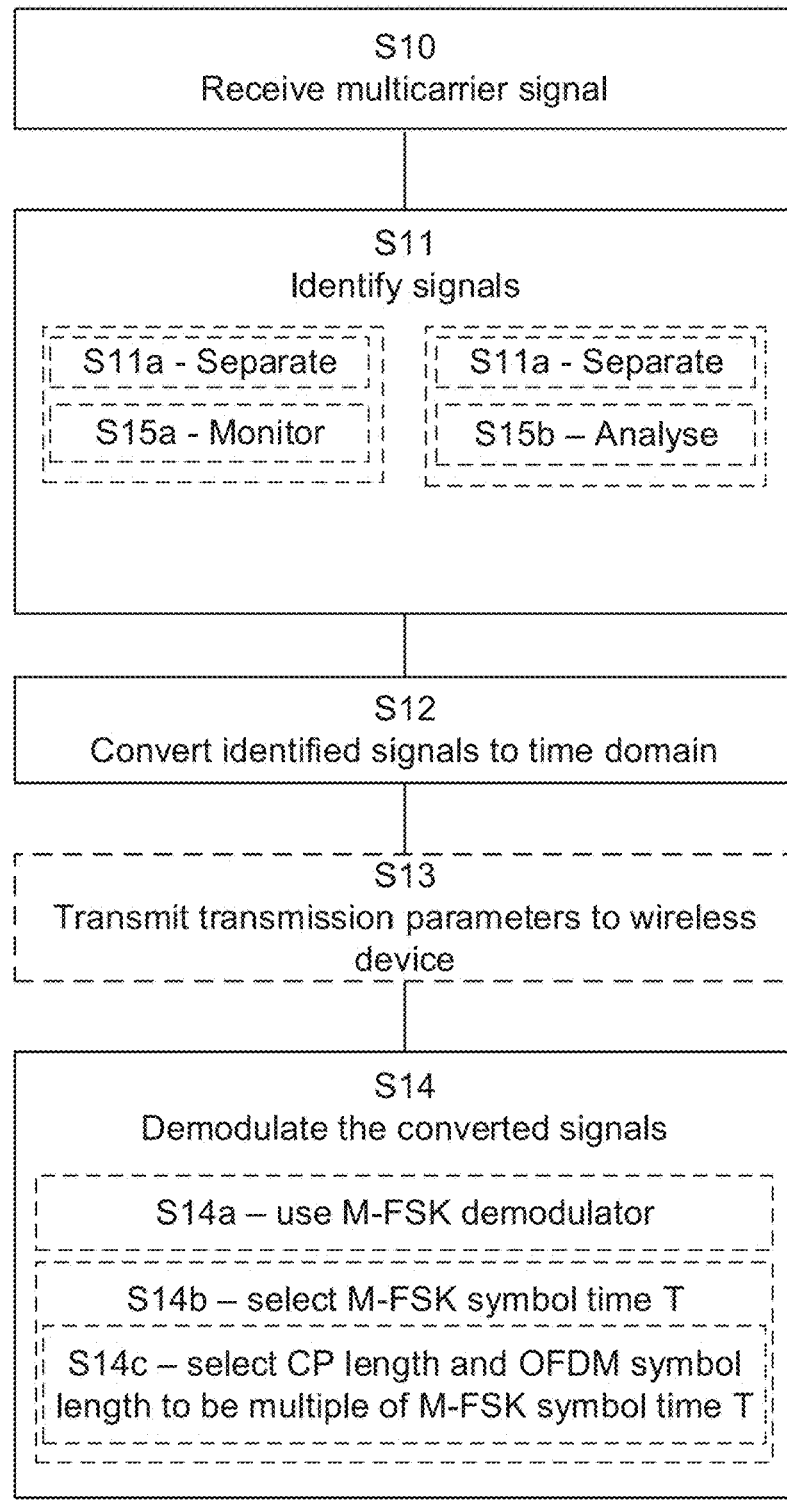
FIG. 16 is a flowchart that illustrates the method steps for receiving a multicarrier signal comprising data transmitted from multiple transmitters.

FIG. 16 is a flowchart that illustrates a method, performed in a network node in an Orthogonal Frequency-Division Multiple Access, OFDMA, system for receiving data transmitted from a wireless device wherein the OFDMA system has multiple resource units, each resource unit occupying predetermined frequency ranges.

The first step in the flow comprises receiving S10 a multicarrier signal using an Orthogonal Frequency-Division Multiplexing, OFDM, receiver.

The flow continues to the second step comprising identifying S11 signals from the wireless device using a modulation scheme other than OFDM in at least one resource unit. According to some aspects of the disclosure, the step of identifying S11 the signals from the wireless device comprises separating 11a the multiple users using Fast Fourier Transform, FFT.

Thereafter, the flow continues to the third step comprising converting S12 the identified signals to time domain. According to some aspects of the disclosure, step of converting S12 the identified signals is performed using a single Inverse Fast Fourier Transform, IFFT.

Finally, the fourth step ends the flow by demodulating S14 the converted signals.

The OFDMA system has a Cyclic Prefix, CP, length, an OFDM symbol length and multiple sub-carriers, each sub-carrier has a centre of frequency, and according to some aspects of the disclosure, the method further comprises transmitting S13 a set of allowed combinations of transmission parameters including at least one of the CP length, the OFDM symbol length and the centre of frequency of the sub-carriers to the wireless device.

According to some aspects of the disclosure, the step of demodulating the converted signals comprises using S14a a M-ary Frequency Shift Keying, M-FSK, demodulator, M is an integer two or higher and the M-FSK has a symbol time T, and according to this aspect, the method further comprises selecting S14b the M-FSK symbol time T based on at least one of the CP length, the OFDM symbol length and the centre of frequency of the sub-carriers.

According to some aspects of the disclosure, the method further comprises selecting S14c the symbol time T in such a way that the CP length and the OFDM symbol length each are multiples of the M-FSK symbol time T.

According to some aspects of the disclosure, the duration of the CP length, $T_{CP}$, and the duration of the OFDM symbol length, $T_{OFDM}$, is expressed as:

$T_{CP}=P\cdot T$ and $T_{OFDM}=Q\cdot T$; P and Q are positive integers, $K\cdot T=T_{CP}+T_{OFDM}$, wherein K=P+Q; K is a positive integer.

According to this aspect, the M-FSK symbol time T is selected to be:

$$T=(T_{CP}+T_{OFDM})/K.$$

Assume N is the number of subcarriers in the OFDMA system and, according to some aspects of the disclosure, K is a divisor of N.

According to some aspects of the disclosure, the at least one resource unit is predetermined and the step of identifying S11 the signals from the wireless device further comprises monitoring S15a the predetermined at least one resource unit to identify signals using a modulation scheme other than OFDM.

According to some aspects of the disclosure, the step of identifying S11 the signals from the wireless device further comprises analysing S15b the separated signals to identify the at least one resource unit comprising signals using a modulation scheme other than OFDM. Alternative ways of performing the analysing step have been described in detail above.

According to some aspects of the disclosure the method for transmitting data from a wireless device and the method for receiving data in a wireless network node may be combined. Thus defining a method for communicating data from a wireless device to a wireless network node in an Orthogonal Frequency-Division Multiple Access, OFDMA, system having multiple resource units, each resource unit occupying a predetermined frequency range, the method comprises transmitting data from the wireless device according to any of claims 1-8, and receiving data in the wireless network node according to any of claims 9-18.

Figure 17:
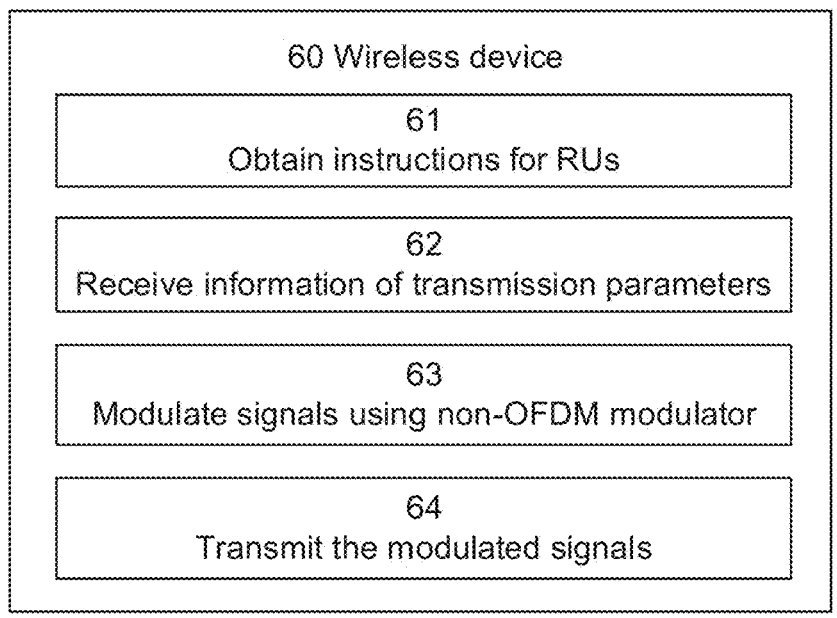
FIG. 17 illustrates a wireless device configured to transmit data using a non-OFDM signal in an OFDMA system.

FIG. 17 illustrates a wireless device 60 configured to transmit data to a multi-modulation receiver in a wireless network node in an Orthogonal Frequency-Division Multiple Access, OFDMA, system having multiple resource units, each resource unit occupying predetermined frequency ranges. The wireless device 60 comprises:

A first module 61 configured to obtain instructions to use at least one of the resource units for data transmission.

A second module 62 configured to receive information regarding a set of allowed combinations of transmission parameters to use when modulating signals.

A third module 63 configured to modulate signals from the wireless device based on the combination of the received transmission parameters to create signals having constant amplitude and/or continuous phase in the time domain using a modulation scheme other than Orthogonal Frequency-Division Multiplexing, OFDM.

A fourth module 64 configured to transmit the modulated signals in the frequency ranges defined by the used at least one of the resource units.

Figure 18:
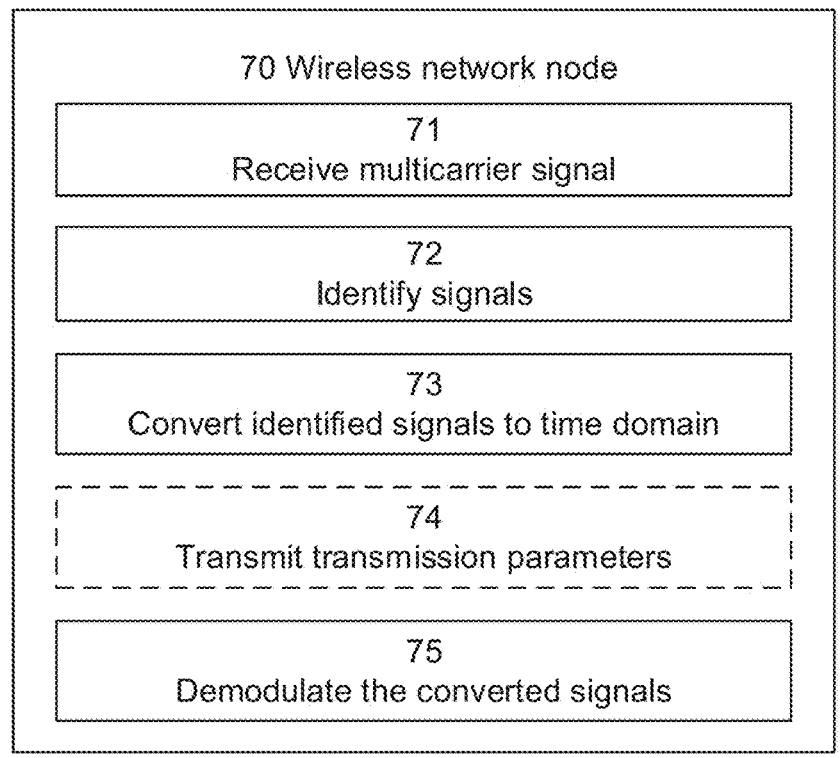
FIG. 18 illustrates a wireless network node configured to receive a multi-carrier signal comprising data transmitted from multiple transmitters.

FIG. 18 illustrates a wireless network node 70 in an Orthogonal Frequency-Division Multiple Access, OFDMA, system for receiving data transmitted from a wireless device wherein the OFDMA system has multiple resource units, each resource unit occupying predetermined frequency ranges. The wireless network node comprises:

A fifth module 71 configured to receive a multicarrier signal using an Orthogonal Frequency-Division Multiplexing, OFDM, receiver.

A sixth module 72 configured to identify signals from the wireless device using a modulation scheme other than OFDM in at least one resource unit.

A seventh module 73 configured to convert the identified signals to time domain.

An eight module 75 configured to demodulate the converted signals.

According to some aspects of the disclosure, the wireless network node further comprises a ninth module 74 configured to transmit a set of allowed combinations of transmission parameters including at least one of the CP length, the OFDM symbol length and the centre of frequency of the sub-carriers to the wireless device.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

Also note that terminology such as eNodeB and wireless device should be considered as non-limiting and does in particular not imply a certain hierarchical relation between the two. In general "eNodeB" could be considered as device 1 and "wireless device" as device 2, and these two devices communicate with each other over some radio channel. Furthermore, while the example embodiments focus on wireless transmissions in the downlink, it should be appreciated that the example embodiments are equally applicable in the uplink.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system, GPS, receiver; a personal communications system, PCS, user equipment that may combine a cellular radiotelephone with data processing; a personal digital assistant, PDA, that can include a radiotelephone or wireless communication system; a laptop; a camera (e.g., video and/or still image camera) having communication ability; and any other computation or communication device capable of transceiving, such as a personal computer, a home entertainment system, a television, sensors, actuators etc. Furthermore, a device may be interpreted as any number of antennas or antenna elements.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a wireless device, for transmitting data from the wireless device to a wireless network node in an Orthogonal Frequency-Division Multiple Access (OFDMA) system having multiple resource units where each resource unit is occupying predetermined frequency ranges, and the OFDMA system includes a Cyclic Prefix (CP) length, and an Orthogonal Frequency-Division Multiplexing (OFDM) symbol length, the method comprising:
   obtaining instructions to use at least one of the resource units for data transmission;
   receiving information regarding a set of allowed combinations of transmission parameters to use when modulating signals;
   modulating the signals to be transmitted from the wireless device based on a combination of the received transmission parameters to create signals having constant amplitude and/or continuous phase in a time domain using a modulation scheme other than OFDM, wherein the step of modulating signals from the wireless device further comprises:
      generating M-ary Frequency Shift Keying (M-FSK), where M is an integer two or higher and the M-FSK has a symbol time T; and
      selecting the M-FSK symbol time T based on the CP length and the OFDM symbol length; and
   transmitting the modulated signals in frequency ranges defined by the at least one of the resource units used for data transmission.

2. The method according to claim 1, wherein the OFDMA system has multiple sub-carriers, each sub-carrier having a centre of frequency, and the method further comprises selecting the received set of allowed combinations of transmission parameters to include at least one of the CP length, the OFDM symbol length, and the centre of frequency of the sub-carriers.

3. The method according to claim 2, wherein the method further comprises selecting the M-FSK symbol time T in such a way that the CP length and the OFDM symbol length each are multiples of the M-FSK symbol time T.

4. The method according to claim 3, wherein duration of the CP length, $T_{CP}$, and duration of the OFDM symbol length, $T_{OFDM}$, are expressed as:
$T_{CP}=P \cdot T$ and $T_{OFDM}=Q \cdot T$; P and Q are positive integers;
$K \cdot T = T_{CP} + T_{OFDM}$, wherein $K=P+Q$; K is a positive integer; and
the M-FSK symbol time T is selected to be $(T_{CP}+T_{OFDM})/K$.

5. The method according to claim 4, wherein N is an integer corresponding to the number of sub-carriers in the OFDMA system and K is a divisor of N.

6. The method according to claim 2, wherein sub-carriers of the OFDMA system are arranged in a sub-channel raster, and the method further comprises selecting frequencies of the signals to generate an M-FSK modulation having frequencies coinciding with frequencies present in the OFDMA sub-channel raster.

7. The method according to claim 1, wherein the step of obtaining the instructions to use the at least one resource unit comprises receiving transmissions from the wireless network node indicating at least one resource unit is available when transmitting the modulated signals.

8. A method, performed in a network node in an Orthogonal Frequency-Division Multiple Access (OFDMA) system for receiving data transmitted from a wireless device wherein the OFDMA system has multiple resource units, each resource unit occupying predetermined frequency ranges, and the OFDMA system includes a Cyclic Prefix (CP) length and an Orthogonal Frequency-Division Multiplexing (OFDM) symbol length, the method comprising:
   receiving a multicarrier signal using an OFDM receiver;
   identifying signals from the wireless device using a modulation scheme other than OFDM in at least one resource unit, wherein the transmitted signals are modulated in frequency ranges defined by the at least one resource unit;
   converting the identified signals to time domain; and
   demodulating the converted signals, wherein demodulating the converted signals comprises using a M-ary Frequency Shift Keying (M-FSK) demodulator, M is an integer two or higher and the M-FSK has a symbol time T, and the method further comprises selecting the M-FSK symbol time T based on at least one of the CP length, the OFDM symbol length, and the centre of frequency of the sub-carriers.

9. The method according to claim 8, wherein the OFDMA system has multiple sub-carriers, each sub-carrier has a centre of frequency, and the method further comprises transmitting a set of allowed combinations of transmission parameters including at least one of the CP length, the OFDM symbol length, and the centre of frequency of the sub-carriers to the wireless device.

10. The method according to claim 9, wherein the method further comprises selecting the M-FSK symbol time T in such a way that the CP length and the OFDM symbol length each are multiples of the M-FSK symbol time T.

11. The method according to claim 10, wherein duration of the CP length, $T_{CP}$, and duration of the OFDM symbol length, $T_{OFDM}$, are expressed as:

$T_{CP}$=P·T and $T_{OFDM}$=Q·T; P and Q are positive integers;
K·T=$T_{CP}$+$T_{OFDM}$, wherein K=P+Q; K is a positive integer; and
the M-FSK symbol time T is selected to be ($T_{CP}$+$T_{OFDM}$)/K.

12. The method according to claim 11, wherein N is the number of sub-carriers in the OFDMA system and K is a divisor of N.

13. The method according to claim 8, wherein the step of converting the identified signals is performed using a single Inverse Fast Fourier Transform (IFFT).

14. The method according to claim 8, wherein the step of identifying the signals from the wireless device comprises separating the multiple resource units using Fast Fourier Transform (FFT).

15. The method according to claim 14, wherein the at least one resource unit is predetermined and the step of identifying the signals from the wireless device further comprises:
monitoring the predetermined at least one resource unit to identify signals using a modulation scheme other than OFDM.

16. The method according to claim 14, wherein the step of identifying the signals from the wireless device further comprises:
analysing the separated signals to identify the at least one resource unit comprising signals using a modulation scheme other than OFDM.

17. A wireless device comprising:
a communication interface configured to communicate data to a wireless network node in an Orthogonal Frequency-Division Multiple Access (OFDMA) system having multiple resource units each resource unit occupying predetermined frequency ranges, wherein the OFDMA system has a Cyclic Prefix (CP) length and an Orthogonal Frequency-Division Multiplexing (OFDM) symbol length, and
processing circuitry configured to cause the wireless device to:
obtain instructions to use at least one resource unit when transmitting the data to the wireless network node;
receive, using the communication interface; information regarding a set of allowed combinations of transmission parameters to use when modulating signals;
modulate, using a modulator, signals to be transmitted from the wireless device based on a combination of the received transmission parameters to create signals having constant amplitude and/or continuous phase in a time domain using a modulation scheme other than OFDM;
transmit, using the communication interface, the modulated signals in the frequency ranges defined by the at least one of the resource units used for data transmission;
modulate, using the modulator, signals using M-ary Frequency Shift Keying (M-FSK), M is an integer two or higher and the M-FSK has a symbol time T; and
select the M-FSK symbol time T based on the CP length and the OFDM symbol length.

18. The wireless device according to claim 17, wherein the OFDMA system has multiple sub-carriers, each sub-carrier having a centre of frequency, and the received information regarding the set of allowed combinations of transmission parameters comprises at least one of the CP length, the OFDM symbol length, and the centre of frequency of the sub-carriers, and wherein the processing circuitry is further configured to cause the wireless device to:
modulate, using the modulator, signals from the wireless device based on at least one of the CP length, the OFDM symbol length and the centre of frequency of the sub-carriers.

19. The wireless device according to claim 18, wherein the processing circuitry is further configured to cause the wireless device to select the M-FSK symbol time T in such a way that the CP length and the OFDM symbol length each are multiples of the M-FSK symbol time T.

20. The wireless device according to claim 19, wherein duration of the CP length, $T_{CP}$, and duration of the OFDM symbol length, $T_{OFDM}$, are expressed as:
$T_{CP}$=P·T and $T_{OFDM}$=Q·T; P and Q are positive integers;
K·T=$T_{CP}$+$T_{OFDM}$, wherein K=P+Q; K is a positive integer; and
wherein the processing circuitry is further configured to cause the wireless device to select the M-FSK symbol time T to be ($T_{CP}$+$T_{OFDM}$)/K.

21. The wireless device according to claim 20, wherein N is the number of sub-carriers in the OFDMA system and wherein the processing circuitry is further configured to cause the wireless device to select K to be a divisor of N.

22. The wireless device according to claim 18, wherein the sub-carriers of the OFDMA system are arranged in a sub-channel raster, and wherein the processing circuitry is further configured to cause the wireless device to select frequencies of the signals to generate an M-FSK modulation having frequencies coinciding with the frequencies present in the OFDMA sub-channel raster.

23. The wireless device according to claim 17, wherein the processing circuitry is further configured to cause the wireless device to receive transmissions from the wireless network node indicating at least one resource unit is available when transmitting the modulated signals.

24. A wireless network node comprising:
a communication interface configured to receive data from a wireless device in an Orthogonal Frequency-Division Multiple Access (OFDMA) system having multiple resource units where each resource unit occupies a predetermined frequency range, and the OFDMA system includes a Cyclic Prefix (CP) length, an Orthogonal Frequency-Division Multiplexing (OFDM) symbol length, and multiple sub-carriers where each sub-carrier has a centre of frequency; and
processing circuitry configured to cause the wireless network node to:
receive, using the communication interface, a multicarrier signal using an OFDM receiver;

identify signals from the wireless device using a modulation scheme other than OFDM in at least one resource unit, wherein the signals are modulated in frequency ranges defined by the at least one resource unit and the modulation scheme other than OFDM is M-ary Frequency Shift Keying (M-FSK), where M is an integer two or higher and the M-FSK has a symbol time T, and the processing circuitry is further configured to cause the wireless network node to select the M- FSK symbol time T based on at least one of the CP length, the OFDM symbol length, and the centre of frequency of the sub-carriers;

convert, using a converter, the identified signals to time domain; and demodulate, using a demodulator, the converted signals.

25. The wireless network node according to claim 24, wherein the processing circuitry is further configured to cause the wireless network node to:

transmit, using the communication interface, instructions to the wireless device indicating at least one resource unit to use when transmitting modulated signals to the wireless network node.

26. The wireless network node according to claim 24, wherein the OFDMA system has multiple sub-carriers, each sub-carrier has a centre of frequency, and the processing circuitry is further configured to cause the wireless network node to:

determine a set of allowed combinations of transmission parameters including at least one of the CP length, the OFDM symbol length, and the centre of frequency of the sub-carriers, and transmit, using the communication interface, the set of allowed combinations of transmission parameters to the wireless device.

27. The wireless network node according to claim 26, wherein the processing circuitry is further configured to cause the wireless network node to select the M-FSK symbol time T in such a way that the CP length and the OFDM symbol length each are multiples of the M-FSK symbol time T.

28. The wireless network node according to claim 27, wherein duration of the CP length, $T_{CP}$, and duration of the OFDM symbol length, $T_{OFDM}$, are expressed as:

$T_{CP}$=P·T and $T_{OFDM}$=Q·T; P and Q are positive integers;

K·T=$T_{CP}$+$T_{OFDM}$, wherein K=P+Q; K is a positive integer; and wherein the processing circuitry is further configured to cause the wireless network node to select the M-FSK symbol time T to be ($T_{CP}$+$T_{OFDM}$)/K.

29. The wireless network node according to claim 28, wherein N is the number of sub-carriers in the OFDMA system and the processing circuitry is further configured to cause the wireless network node to select K to be a divisor of N.

30. The wireless network node according to claim 24, wherein the converter is a single Inverse Fast Fourier Transform (IFFT).

31. The wireless network node according to claim 24, wherein the processing circuitry is further configured to cause the wireless network node to:

separate, using a Fast Fourier Transform (FFT), signals received by the OFDM receiver.

32. The wireless network node according to claim 31, wherein the at least one resource unit is predetermined and wherein the processing circuitry is further configured to cause the wireless network node to:

monitor the predetermined at least one resource unit to identify signals using a modulation scheme other than OFDM.

33. The wireless network node according to claim 31, wherein the processing circuitry is further configured to cause the wireless network node to:

analyse, using an analyser the separated signals to identify the at least one resource unit comprising signals using a modulation scheme other than OFDM.

* * * * *